(12) United States Patent
Trajkovska et al.

(10) Patent No.: US 9,199,420 B2
(45) Date of Patent: Dec. 1, 2015

(54) FLEXIBLE FILM WITH SURFACE RELIEF AND USE THEREOF IN ELECTRO-ACTIVE OPTICAL SYSTEMS

(71) Applicant: Mitsui Chemicals, Inc., Tokyo (JP)

(72) Inventors: Anita Trajkovska, Christiansburg, VA (US); Ronald D. Blum, Roanoke, VA (US); William Kokonaski, Gig Harbor, WA (US)

(73) Assignee: Mitsui Chemicals, Inc., Tokyo (JP)

( * ) Notice: Subject to any disclaimer, the term of this patent is extended or adjusted under 35 U.S.C. 154(b) by 37 days.

(21) Appl. No.: 13/742,804

(22) Filed: Jan. 16, 2013

(65) Prior Publication Data
US 2013/0224440 A1    Aug. 29, 2013

Related U.S. Application Data (60) Provisional application No. 61/587,260, filed on Jan. 17, 2012, provisional application No. 61/728,940, filed on Nov. 21, 2012, provisional application No. 61/733,031, filed on Dec. 4, 2012.

(51) Int. Cl.
*B29C 65/54* (2006.01)
*B32B 37/12* (2006.01)
*B32B 37/26* (2006.01)
(Continued)

(52) U.S. Cl.
CPC .......... *B29D 11/0073* (2013.01); *G02B 5/1814* (2013.01); *G02B 5/1847* (2013.01); *G02F 1/29* (2013.01); *G02F 2001/294* (2013.01); *Y10T 428/24479* (2015.01); *Y10T 428/24521* (2015.01)

(58) Field of Classification Search
CPC .. H01L 21/6835; B29C 65/02; B29C 66/004; B32B 7/06; B32B 27/00; B32B 37/26; B32B 43/006; B05D 1/325; B05D 1/327; B29D 11/0073; G02F 1/29; G02F 2001/294; G02B 5/1814; G02B 5/1847
USPC ................................ 156/247, 289, 701, 703
See application file for complete search history.

(56) References Cited

U.S. PATENT DOCUMENTS 5,733,483 A * 3/1998 Soane et al. .............. 264/1.7
7,074,463 B2 * 7/2006 Jones et al. .............. 428/1.1
(Continued)

FOREIGN PATENT DOCUMENTS

JP   2000098115 A  *  4/2000  ............. G02B 5/18
JP   2000347204 A  * 12/2000  ............. G02F 1/1341
(Continued)

OTHER PUBLICATIONS

English Abstract of JP 2000-098115 (Dec. 10, 2014).*
(Continued)

*Primary Examiner* — Sing P Chan
(74) *Attorney, Agent, or Firm* — Sterne, Kessler, Goldstein & Fox P.L.L.C.

(57) ABSTRACT

The present invention relates generally to flexible thin films for use in electro-active optical systems. Embodiments of the invention include thin films having diffractive structures on at least one surface of the film, and methods of making such films. Embodiments of the invention also include lens blanks that comprise such thin films. Embodiments of the invention also include methods of making lens blanks that comprise such thin films.

23 Claims, 10 Drawing Sheets

(51) Int. Cl.
  *B32B 38/10* (2006.01)
  *B29D 11/00* (2006.01)
  *G02B 5/18* (2006.01)
  *G02F 1/29* (2006.01)

(56) References Cited

U.S. PATENT DOCUMENTS

| | | | |
|---|---|---|---|
| 7,520,972 B2* | 4/2009 | Keller et al. | 205/70 |
| 2002/0126377 A1 | 9/2002 | Nakagawa et al. | |
| 2003/0122269 A1* | 7/2003 | Weber et al. | 264/1.31 |
| 2004/0080606 A1 | 4/2004 | Ishida et al. | |
| 2007/0081126 A1* | 4/2007 | Blum et al. | 351/159 |
| 2007/0285788 A1 | 12/2007 | Yeh et al. | |
| 2008/0024866 A1 | 1/2008 | Walter et al. | |
| 2008/0152875 A1 | 6/2008 | Tomita et al. | |
| 2009/0086326 A1 | 4/2009 | Hamamoto et al. | |
| 2010/0112296 A1 | 5/2010 | Yoshihara et al. | |
| 2010/0290250 A1 | 11/2010 | Toyota et al. | |
| 2011/0058150 A1 | 3/2011 | Schaper | |

FOREIGN PATENT DOCUMENTS

| | | |
|---|---|---|
| JP | 2002-162514 A | 6/2002 |
| JP | 2009-210911 A | 9/2009 |
| WO | WO 2011-021707 A1 | 2/2011 |

OTHER PUBLICATIONS

English Abstract of JP 2000-347204 (Dec. 10, 2014).*
Machine Translation of JP 2000-098115 (Dec. 10, 2014).*
Machine Translation of JP 2000-347204 (Dec. 10, 2014).*
Hwang et al. "Fabrication of roll imprint stamp for continuous UV roll imprinting process" Microelectronic Engineering 86 (2009) 642-645 (Abstract).
Elsner et al. "3-D-microstructure replication process using UV-curable acrylates" Microelectronic Engineering 63 (2003) 163-170 (Abstract).
International Search Report for PCT/US13/21754, mailed Mar. 25, 2013, 3 pages.

* cited by examiner

FLEXIBLE FILM WITH SURFACE RELIEF AND USE THEREOF IN ELECTRO-ACTIVE OPTICAL SYSTEMS

CROSS-REFERENCE TO RELATED APPLICATIONS

The present application claims the benefit of priority to U.S. Provisional Patent Application No. 61/587,260, filed Jan. 17, 2012, U.S. Provisional Patent Application No. 61/728,940, filed Nov. 21, 2012, and U.S. Provisional Patent Application No. 61/733,031, filed Dec. 4, 2012. Each of the aforementioned applications is hereby incorporated by reference as though fully set forth herein.

FIELD OF THE INVENTION

The present invention relates generally to flexible thin films for use in electro-active optical systems. Embodiments of the invention include thin films having diffractive structures on at least one surface of the film, and methods of making such films. Embodiments of the invention also include lens blanks that comprise such thin films. Embodiments of the invention also include methods of making lens blanks that comprise such thin films.

BACKGROUND

Optically transparent thin films can be incorporated into various lens systems, and, in many instances, bear certain relief structures, such as diffractive structures. These relief structures can be etched or embossed onto the thin film, which means that forming the film and forming the relief structures requires at least two separate steps. These separate processing steps increases the time and effort required to make such films. Therefore, it may be desirable to develop a manufacturing process that allows the relief structures and the film to be formed simultaneously, thereby reducing the processing time and cost of making the film.

Further, such films are generally flat. In instances where it is desirable to fit the film over a curved surface (e.g., a convex or concave surface), the film can be stretched to fit the shape of the curved surface onto which the film is disposed. This stretching causes additional force to be exerted against the film, thereby making the film more susceptible to mechanical breakdown or mechanical failure. Therefore, it may be desirable to develop a film and a manufacturing process therefor, where the film is formed so as to have a shape that is substantially similar as that of the surface onto which it is to be disposed, thereby partially or completely alleviating the need to stretch the film over the curved surface.

Further, when such films are used in certain optical systems, such as an electro-active optical lens blanks, the films can be used to help seal the electro-active material into a cavity within the blank. Because the film may be under some degree of mechanical stress (described above), it can be difficult to dispose the electro-active material into the cavity while maintaining the necessary mechanical stress on the film. Therefore, it may be desirable to develop a simpler process for disposing the electro-active material within the cavity without risking disruption of the physical integrity of the film.

SUMMARY OF THE INVENTION

In at least one aspect, the invention provides methods of making a film having surface relief features, comprising: (a) providing a first substrate having a first surface, wherein the first substrate is composed of a water-soluble solid material; (b) providing a second substrate having a first surface, wherein the second substrate is composed of a solid material and the first surface of the second substrate comprises one or more relief structures; (c) providing a curable liquid material; (d) disposing the curable liquid material between the first surface of the first substrate and the first surface of the second substrate, wherein the first surface of the first substrate and the first surface of the second substrate are adjacent to each other; (e) curing the curable liquid material to form a polymeric film between the first surface of the first substrate and the first surface of the second substrate; and (f) exposing the first surface to an aqueous medium, thereby dissolving the first substrate.

In another aspect, the invention provides thin films, comprising: (a) a naturally curved first surface; and (b) a naturally curved second surface disposed opposite the naturally curved second surface, wherein the naturally curved second surface comprises one or more relief structures; wherein the naturally curved first surface is concave, and the naturally curved second surface is convex, and wherein the radius of curvature of the naturally curved first surface is within 15% of the radius of curvature of the naturally curved second surface.

In another aspect, the invention provides electro-active systems, comprising: (a) a curved substrate having a concave surface and a convex surface, wherein the concave surface is opposite the convex surface; (b) a thin film according to any of the embodiments described herein disposed on the concave surface of the curved substrate such that the naturally curved second surface of the thin film faces the concave surface of the curved substrate. In some further aspects, the invention provides lenses or lens blanks where such electro-active systems are disposed on the lenses or lens blanks.

In another aspect, the invention provides methods of making an electro-active system, comprising: (a) providing a curved substrate having a concave surface and a convex surface, wherein the concave surface is opposite the convex surface; (b) providing a thin film of any of the embodiments described herein; (c) securing the thin film to the curved substrate such that the naturally curved second surface of the thin film faces the concave surface of the curved substrate and forms a sealed cavity between the thin film and the curved substrate; and (d) injecting an electro-active material into the sealed cavity via an injection site in the thin film. In some further aspects, the invention provides methods of making lenses or lens blanks comprising making an electro-active system, and disposing the electro-active system on lenses or lens blanks.

Further aspects and embodiments of the invention are provided in the detailed description that follows and in the accompanying figures.

BRIEF DESCRIPTION OF DRAWINGS

The application includes the following figures. These figures depicts certain illustrative embodiments of various aspects of the invention. The figures are not intended to limit the scope of the claimed subject matter apart from an express indication to the contrary.

DETAILED DESCRIPTION

The following description recites various aspects and embodiments of the present invention. No particular embodiment is intended to define the scope of the invention. Rather, the embodiments merely provide non-limiting examples various compositions, apparatuses, and methods that are at least included within the scope of the invention. The description is to be read from the perspective of one of ordinary skill in the art; therefore, information well known to the skilled artisan is not necessarily included.

As used herein, the articles "a," "an," and "the" include plural referents, unless expressly and unequivocally disclaimed.

As used herein, the conjunction "or" does not imply a disjunctive set. Thus, the phrase "A or B is present" includes each of the following scenarios: (a) A is present and B is not present; (b) A is not present and B is present; and (c) A and B are both present. Thus, the term "or" does not imply an either/or situation, unless expressly indicated.

As used herein, the term "comprise," "comprises," or "comprising" implies an open set, such that other elements can be present in addition to those expressly recited.

Unless otherwise indicated, all numbers expressing quantities of ingredients, reaction conditions, and so forth used in the specification are to be understood as being modified in all instances by the term "about." Accordingly, unless indicated to the contrary, the numerical parameters set forth in the following specification are approximations that can vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10.

In at least one aspect, the invention provides methods of making a film having surface relief features, comprising: (a) providing a first substrate having a first surface, wherein the first substrate is composed of a water-soluble solid material; (b) providing a second substrate having a first surface, wherein the second substrate is composed of a solid material and the first surface of the second substrate comprises one or more relief structures; (c) providing a curable liquid material; (d) disposing the first surface of the first substrate adjacent to the first surface of the second substrate, and disposing the curable liquid material between the first surface of the first substrate and the first surface of the second substrate; (e) curing the curable liquid material to form a polymeric film between the first surface of the first substrate and the first surface of the second substrate; and (f) exposing the first surface to an aqueous medium, thereby dissolving the first substrate.

The first substrate is a substrate that has a first surface and is composed of a solid material that is soluble in water or other aqueous media. The first surface can have any acceptable texture. In some embodiments, the surface is a surface that is generally smooth or even. The first substrate is composed of a solid material that is soluble in water or other aqueous media. In this context, the term "soluble" does not necessarily imply that every molecule of the solid necessarily solubilizes an aqueous medium. Rather, in this context, the term implies that the solid material loses its internal structural integrity when exposed to an aqueous medium. For example, in some embodiments, the water soluble solid material refers to a solid material that, when exposed to an aqueous medium, loses its internal structural integrity and can therefore be washed away by exposing it to water or other aqueous media. The invention is not limited to any particular such material. For example, in some embodiments, the water soluble solid material is an inorganic material, including, but not limited to, metal oxides, such as silica, alumina, or titania. In some other embodiments, the water soluble solid material is a water soluble polymer, including, but not limited to polyvinyl alcohol, a polyacrylamide, a polyacrylic acid (e.g., polyacrylic acid or partially esterified derivatives thereof), a polyisocyanate, a starch, or a cellulose (e.g., carboxymethylcellulose, hydroxymethylcellulose, etc.). In some embodiments, the water soluble solid material is polyvinyl alcohol.

The first surface of the first substrate can have any desired shape. In some embodiments, the first surface of the first substrate is a flat surface. In some other embodiments, the first surface of the first substrate is a curved surface, such as a convex or concave surface. In some embodiments, the first surface of the first substrate is a convex surface. In embodiments where the first surface of the first substrate is a curved surface, the surface can have any suitable radius of curvature, depending on the desired curvature of the resulting thin film.

In some embodiments, the first surface of the first substrate is at least partially coated with an agent that can facilitate release of the thin film from the surface following the curing. In some embodiments, this agent is a surface release agent. In some other embodiments, the agent is polyvinyl alcohol.

The second substrate is a solid substrate having a first surface that comprises one or more relief structures. The first surface of the second substrate can have any desired shape. In some embodiments, the first surface of the second substrate is a flat surface. In some other embodiments, the first surface of the second substrate is a curved surface, such as a convex or concave surface. In some embodiments, the first surface of the second substrate is a concave surface. In embodiments where the first surface of the second substrate is a curved surface, the surface can have any suitable radius of curvature, depending on the desired curvature of the resulting thin film.

In some embodiments, the first surface of the first substrate is a convex surface, and the first surface of the second substrate is a concave surface. In some such embodiments, the two curved surfaces have similar radii of curvature, for example the radius of curvature of the first surface of the first substrate is within 1%, or 2%, or 3%, or 5%, or 7%, or 10%, or 15%, or 20% of the radius of curvature of the first surface of the second substrate.

The first surface of the second substrate comprises one or more relief structures. In some embodiments, the first surface of the second substrate comprises a plurality of relief structures, for example from 2 to 500, or from 5 to 200, or from 10 to 100 relief structures. The relief structures can be formed in any suitable way, e.g., by any suitable combination of recesses and extensions from the plane of the surface. In some embodiments, the relief structures are inverted diffractive structures. The relief structures can be of any suitable size and shape. In some embodiments, the relief structures have a height ranging from 1 nm to 3 mm, or from 1 nm to 2 mm, or from 1 nm to 1 mm, or from 1 nm to 500 µm, or from 10 nm to 500 µm, or from 100 nm to 500 µm, or from 1 µm to 500 µm. In embodiments where the surface comprises a plurality of relief structures, the relief structures can be separated by any suitable distance. In some embodiments, one or more pairs of adjacent relief structures are separated by a distance ranging from 1 nm to 3 mm, or from 1 nm to 2 mm, or from 1 nm to 1 mm, or from 1 nm to 500 µm, or from 10 nm to 500 µm, or from 100 nm to 500 µm, or from 1 µm to 500 µm.

The invention is not limited to any particular curable liquid material. In some embodiments, the curable liquid material comprises an organic material. In some such embodiments, the curable liquid material comprises a monomers, oligomers, or a mixture thereof. In some embodiments, the curable liquid material is a thermally curable resin, which can be cured by heat to form a solid or semi-solid material. Thermally curable resins are well known to those of skill in the art, and include, but are not limited to silicones, polyamides, polyurethanes, and epoxy resins. In some other embodiments, the curable liquid material is cured by intense electron beam (EB-cured resin). In some other embodiments, the curable liquid material is a photo-curable resin, such as a UV-curable resin. Photo-curable resins are well known to those of skill in the art and include, but are not limited to, acrylic resins, urethane resins (e.g., thiourethane resins), epoxy resins, or any mixtures thereof. In some embodiments, the photo-curable resin comprises an acrylic resin. In some other embodiments, the photo-curable resin comprises a thiourethane resin. Various commercially available photo-curable resins can also be used, such as DOUBLEMER resins DYMAX resins, SARTOMER resins, RADCURE resins, Shikoh UV-curable resins (by Nippon Gohsei), Nippon Kayaku resins, and the like.

The method includes disposing the curable liquid material between the first surface of the first substrate and the first surface of the second substrate, wherein the first surface of the first substrate and the first surface of the second substrate are adjacent to each other. The two substrate surfaces can be separated by any suitable distance, depending on the desired thickness of the thin film. In some embodiments, the surfaces of the two substrates are separated by a distance ranging from 1 µm to 1 mm, or from 10 to 500 µm, or from 50 to 200 µm. The resulting size of the film can be controlled by adjusting the volume of the curable liquid material disposed between the two surfaces. In some embodiments, the curable liquid material fills the space between the two substrate surfaces along at least a portion of the surfaces. In some embodiments, the curable liquid material fills the space between the two substrates in the location where the first surface of the second substrate bears one or more relief structures.

The method includes curing the liquid curable material, so as to form a solid or semi-solid polymeric film. The curing can be carried out in any suitable way, depending on the composition of the curable liquid material. In some embodiments, the curing comprises heating the liquid curable material. In some embodiments, the curing comprises exposing the liquid curable material to light, such as ultraviolet light. In some embodiments, the resulting polymeric film is transparent, meaning that it transmits at least 75%, or at least 80%, or at least 85%, or at least 90%, or at least 95%, or at least 97%, or at least 99% of visible light.

The method includes removing the first substrate from the polymeric film. In some embodiments, this removing comprises exposing the first substrate to an aqueous medium, such as water. This exposing can be done in any suitable manner. For example, in some embodiments, the first substrate is sprayed or squirted with a stream of an aqueous medium so as to break down the water-soluble solid material. In some other embodiments, the first substrate is dipped into a bath containing an aqueous medium.

In some embodiments, the method includes removing the polymeric film from the second substrate. In some such embodiments, this removing comprises physically separating the polymeric film from the second substrate. In some embodiments, the first surface of the second substrate is at least partially coated with a surface release agent, thereby facilitating the physical removal process. In some other embodiments, the removing comprises exposing the interface of the polymeric film and the first surface of the second substrate to an aqueous medium, such as water. In some embodiments, the first surface of the second substrate is coated with a thin layer of a water-soluble material, such as polyvinyl alcohol. When the interface is exposed to an aqueous medium, the water-soluble material breaks down and the film is released. This exposing can be done in any suitable manner. For example, in some embodiments, the interface region is sprayed or squirted with a stream of an aqueous medium so as to break down the water-soluble material. In some other embodiments, the second substrate and the film are dipped into a bath containing an aqueous medium. In some embodiments, the first substrate, the second substrate, and the polymeric film are all dipped into an aqueous medium at one time.

The methods described above need not be carried out in a manner in which only a single film is made. Thus, in some embodiments, the method is carried out in a batched process where 2 to 500, or 2 to 250, or 2 to 100, or 2 to 50, or 2 to 25 films are made simultaneously.

Figure 1:
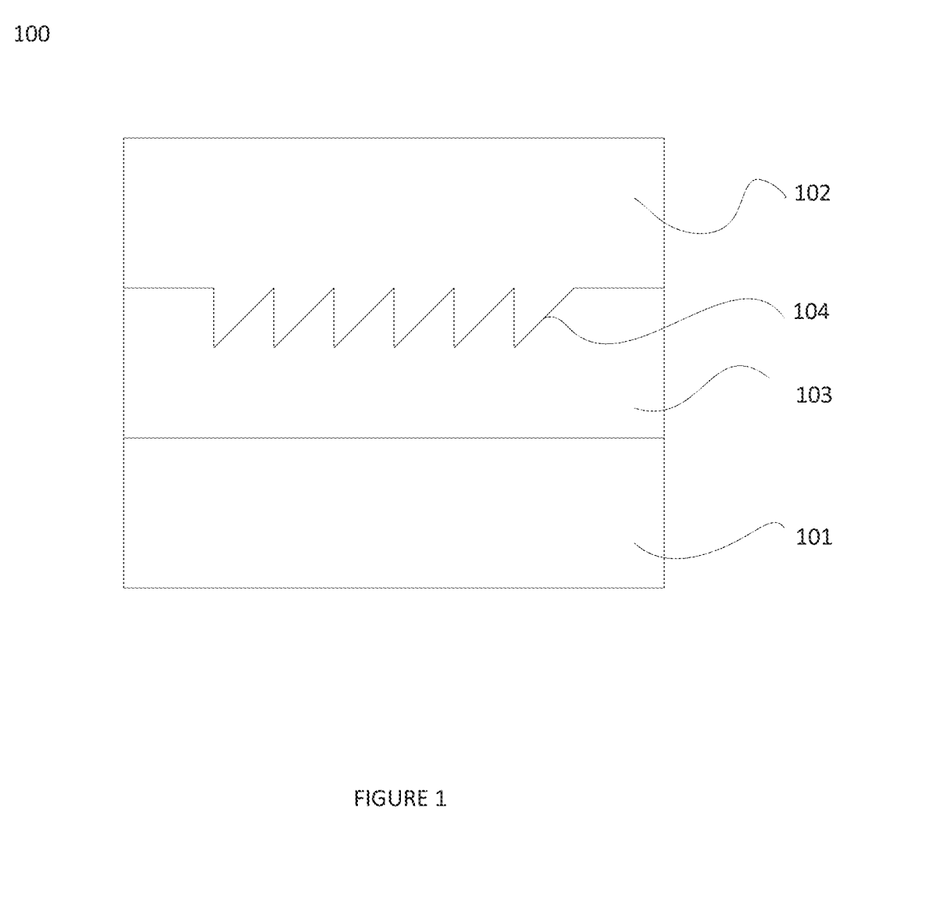
FIG. 1 depicts a stage of the method of making the thin film after the liquid curable material has been disposed between the first and second substrates and before removal of either substrate.
Figure 2:
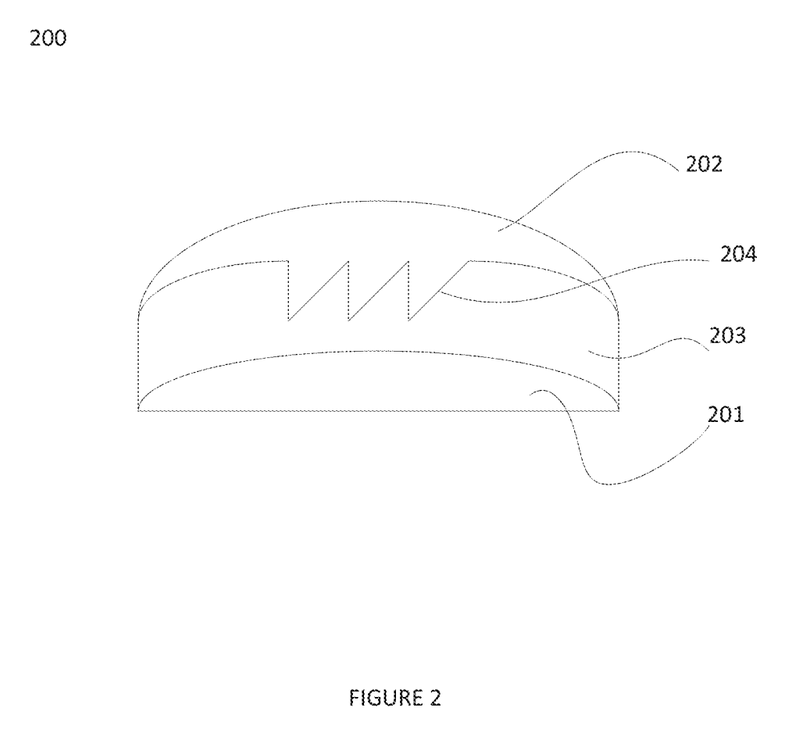
FIG. 2 depicts a stage of the method of making the thin film after the liquid curable material has been disposed between the first and second substrates and before removal of either substrate.

FIG. 1 depicts the method at a stage after the curable liquid material has been added and before removal of the substrates. The diagram shows the first substrate 101 and the second substrate 102, where the second substrate has relief features 104. Between the two substrates lies the curable liquid material. In some other embodiments, the cured thin film 103 lies between the two substrates. FIG. 2 depicts the same, except that the surfaces of the substrates are curved instead of flat. The drawing depicts the first substrate 201, the second substrate 202 having the relief features 204. In some embodiments, the curable liquid material 203 lies between the two substrates. In some other embodiments, the cured thin film 203 lies between the two substrates.

Figure 5:
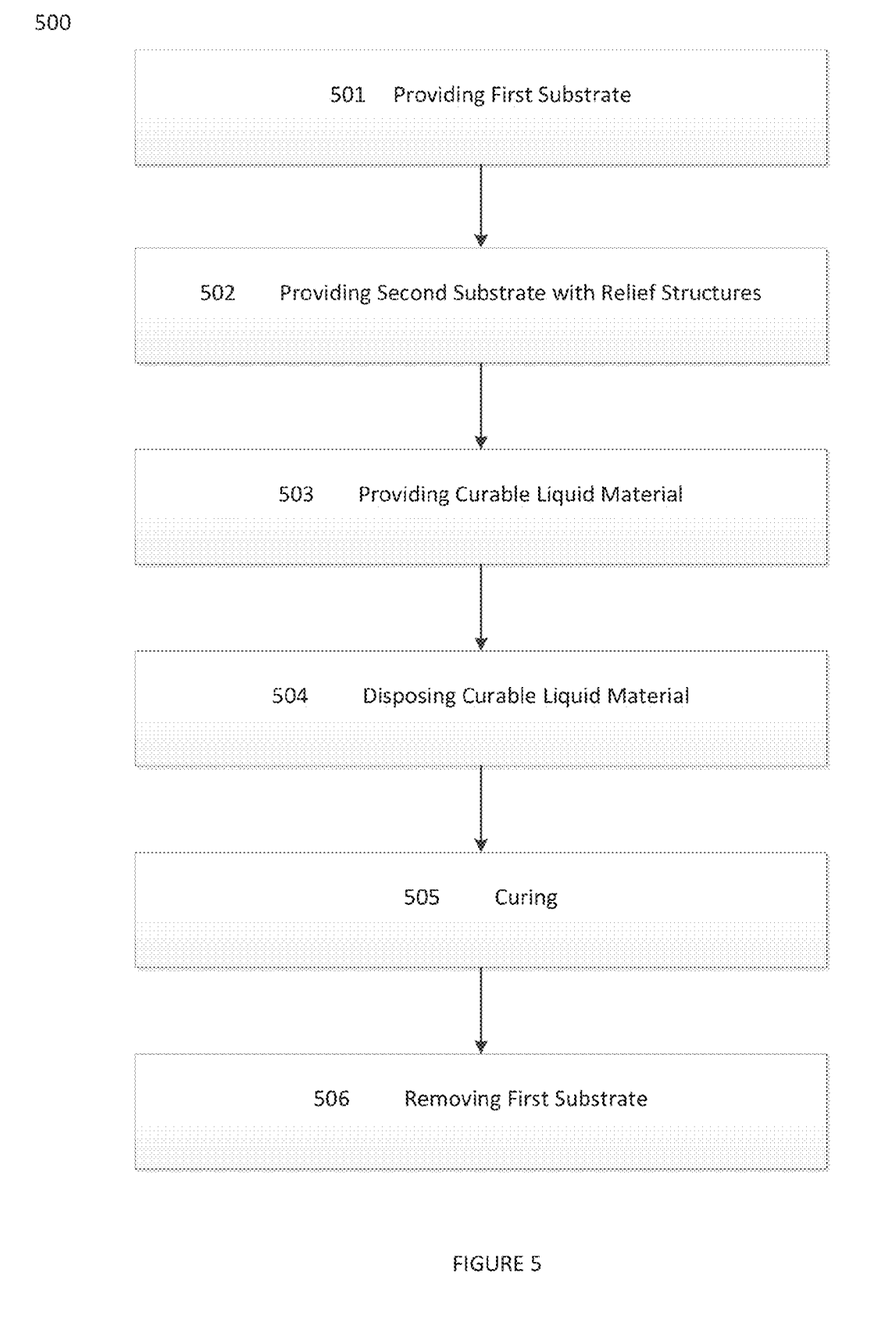
FIG. 5 depicts a flow diagram for a method of making a flexible thin film.

FIG. 5 depicts a flow chart for one embodiment of the invention. In such embodiments, the method includes: (a) providing a first substrate having a first surface, wherein the first substrate is composed of a water-soluble solid material 501; (b) providing a second substrate having a first surface, wherein the second substrate is composed of a solid material and the first surface of the second substrate comprises one or more relief structures 502; (c) providing a curable liquid material 503; (d) disposing the first surface of the first substrate adjacent to the first surface of the second substrate, and disposing the curable liquid material between the first surface of the first substrate and the first surface of the second substrate 504; (e) curing the curable liquid material to form a polymeric film between the first surface of the first substrate and the first surface of the second substrate 505; and (f) exposing the first surface to an aqueous medium, thereby dissolving the first substrate 506.

Figure 3:
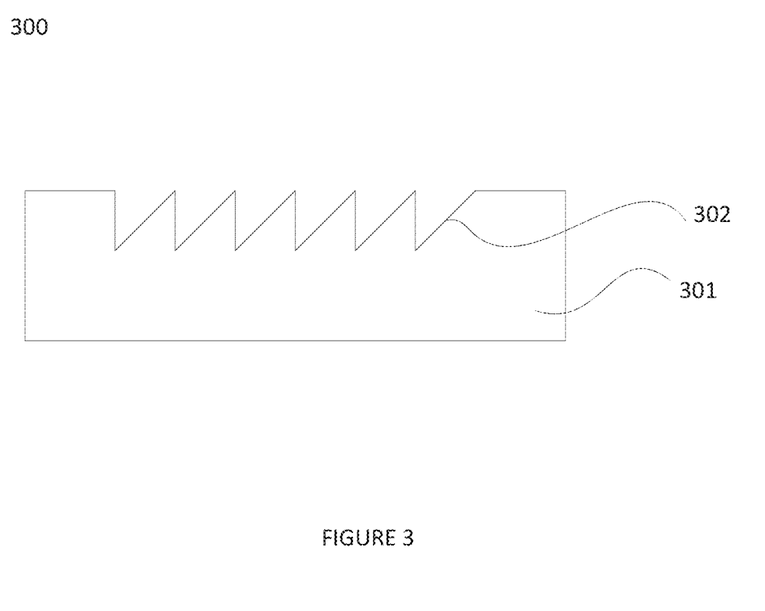
FIG. 3 depicts a flexible thin film having a naturally flat shape.
Figure 4:
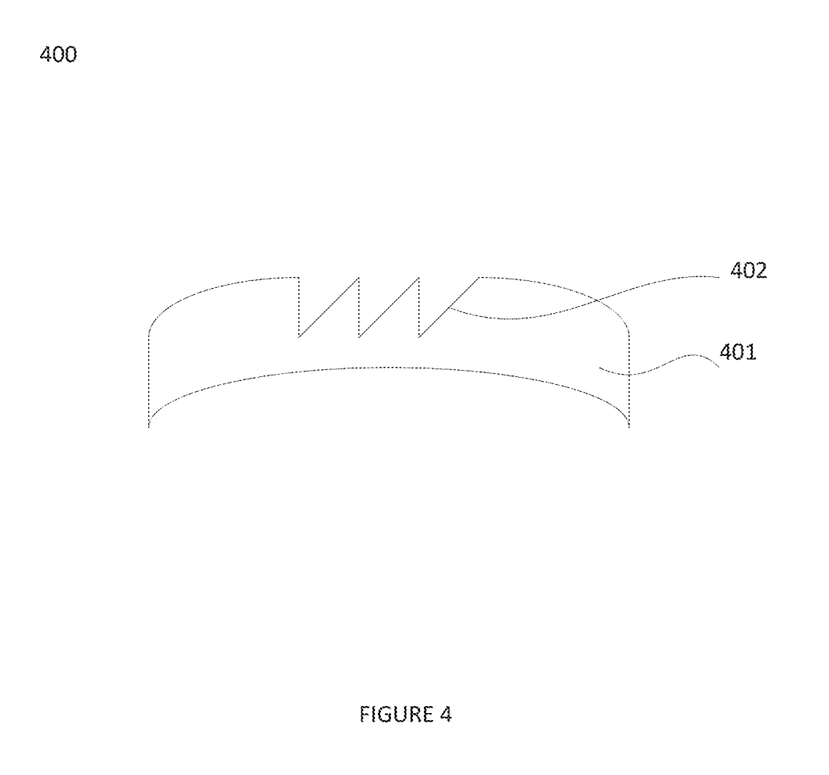
FIG. 4 depicts a flexible thin film having a naturally curved shape.
Figure 6:
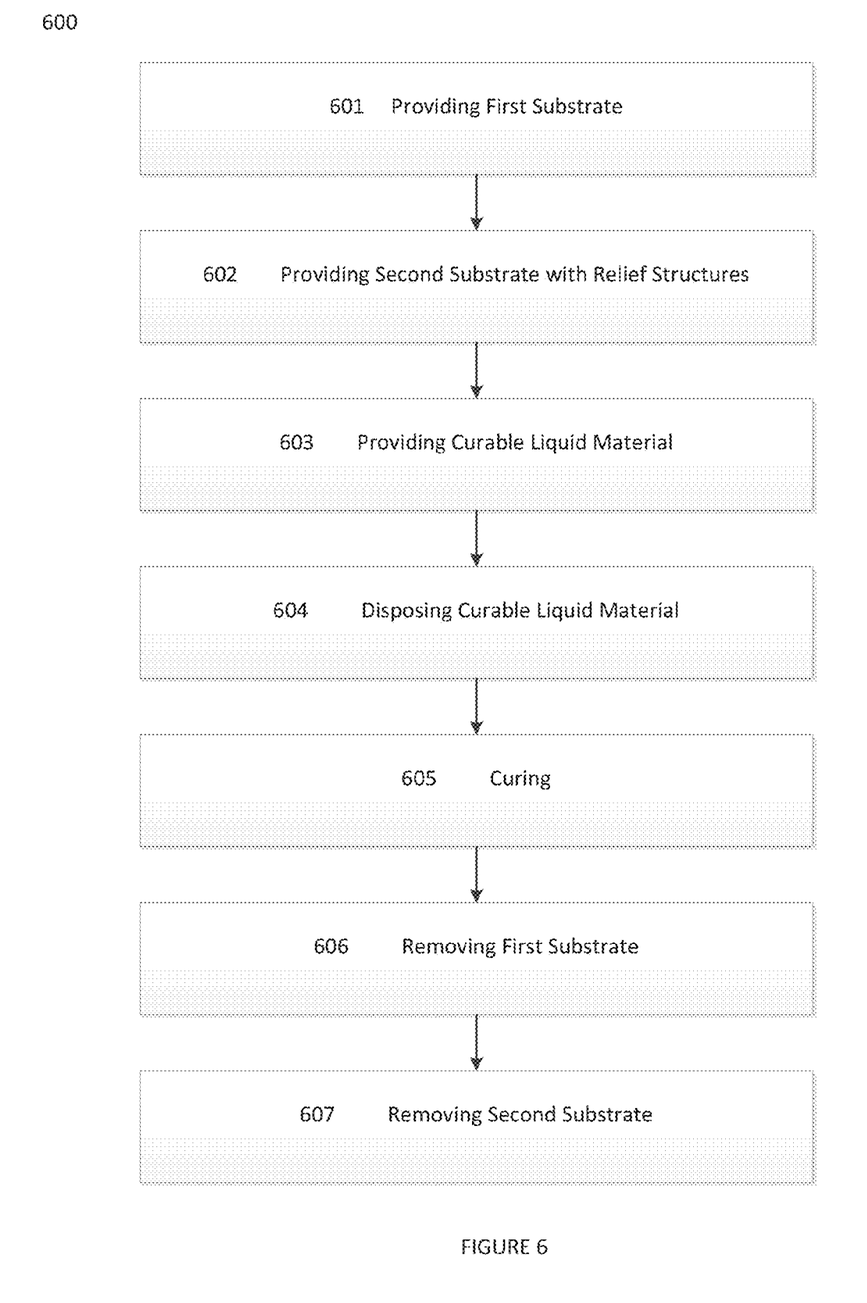
FIG. 6 depicts a flow diagram for a method of making a flexible thin film.

FIG. 6 depicts an alternate embodiment, which includes the steps of: (a) providing a first substrate having a first surface, wherein the first substrate is composed of a water-soluble solid material 601; (b) providing a second substrate having a first surface, wherein the second substrate is composed of a solid material and the first surface of the second substrate comprises one or more relief structures 602; (c) providing a curable liquid material 603; (d) disposing the first surface of the first substrate adjacent to the first surface of the second substrate, and disposing the curable liquid material between the first surface of the first substrate and the first surface of the second substrate 604; (e) curing the curable liquid material to form a polymeric film between the first surface of the first substrate and the first surface of the second substrate 605; (f) exposing the first surface to an aqueous medium, thereby dissolving the first substrate 606; and (g) removing the polymeric film from the second substrate 607. In some embodiments, one can obtain, among other embodiments, a thin film such as that depicted in FIG. 3 or 4. FIG. 3 shows a flat film 301 having relief structures 302. FIG. 4 shows a naturally curved film 401 having relief structures 402.

In another aspect, the invention provides thin films, comprising: (a) a naturally curved first surface; and (b) a naturally curved second surface disposed opposite the naturally curved second surface, wherein the naturally curved second surface comprises one or more relief structures; wherein the naturally curved first surface is concave, and the naturally curved second surface is convex, and wherein the radius of curvature of the naturally curved first surface is within 15% of the radius of curvature of the naturally curved second surface.

The thin film has naturally curved first and second surfaces. In this context, the term "naturally curved" implies that the surfaces exhibit a natural curvature absent the exertion of some external force. The naturally curved first surface is a concave surface, which can have any suitable radius of curvature, depending on the desired curvature of the resulting thin film. The naturally curved second surface is a convex surface, which can have any suitable radius of curvature, depending on the desired curvature of the resulting thin film. In some embodiments, the two curved surfaces have similar radii of curvature, for example the radius of curvature of the naturally curved first surface is within 1%, or 2%, or 3%, or 5%, or 7%, or 10%, or 15%, or 20% of the radius of curvature of the naturally curved second surface.

The naturally curved second surface comprises one or more relief structures. In some embodiments, the naturally curved second surface comprises a plurality of relief structures, for example from 2 to 500, or from 5 to 200, or from 10 to 100 relief structures. The relief structures can be formed in any suitable way, e.g., by any suitable combination of recesses and extensions from the plane of the surface. In some embodiments, the relief structures are diffractive structures. The relief structures can be of any suitable size and shape. In some embodiments, the relief structures have a height ranging from 1 nm to 3 mm, or from 1 nm to 2 mm, or from 1 nm to 1 mm, or from 1 nm to 500 µm, or from 10 nm to 500 µm, or from 100 nm to 500 µm, or from 1 µm to 500 µm. In embodiments where the surface comprises a plurality of relief structures, the relief structures can be separated by any suitable distance. In some embodiments, one or more pairs of adjacent relief structures are separated by a distance ranging from 1 nm to 3 mm, or from 1 nm to 2 mm, or from 1 nm to 1 mm, or from 1 nm to 500 µm, or from 10 nm to 500 µm, or from 100 nm to 500 µm, or from 1 µm to 500 µm.

The relief structures can be formed onto the substrate in any suitable manner. In some embodiments, the relief structures are contiguous with the thin film, meaning that there is no interface between the relief structures and the rest of the film. In some such embodiments, the thin film, including the relief structures, is a continuous unit formed, for example, by using a mold that has the relief structures cut out of the mold.

The thin film can have any suitable appearance. In some embodiments, the thin film is transparent, meaning that it transmits at least 75%, or at least 80%, or at least 85%, or at least 90%, or at least 95%, or at least 97%, or at least 99% of visible light.

The thin film can have any suitable thickness. In some embodiments, the thin film has a thickness ranging from 1 µm to 1 mm, or from 10 to 500 µm, or from 50 to 200 µm. In some embodiments, the thickness is about 50 µm, or 100 µm, or 150 µm, or 200 µm, or 250 µm. The thin film, depending on its thickness, can have any suitable rigidity or flexibility. In some embodiments, however, the thin film is a relative flexible film.

In some aspects of the invention, the thin film can be employed in certain optical systems, such as electro-active systems. In such uses, it may be desirable to make a film having a certain refractive index. Thus, in some embodiments, the thin film has a refractive index of 1.5 to 1.8, or 1.6 to 1.7. In some embodiments, the thin film has a refractive index of 1.60, or 1.61, or 1.62, or 1.63, or 1.64, or 1.65, or 1.66, or 1.67, or 1.68, or 1.69, or 1.70, or 1.71, or 1.72.

FIG. 4 shows at least one embodiment of such a thin film. The film 401 has a naturally curved shape and shows a number of relief structures 402. The films of the invention need not have uniform thickness, and can include films that exhibit thickness gradients and the like. Further, the relief structures 402 need not necessarily lie below the plane of the film itself. In some embodiments, the peaks in the relief structures can extend above the plane of the thin film.

In another aspect, the invention provides electro-active systems, comprising: (a) a curved substrate having a concave surface and a convex surface, wherein the concave surface is opposite the convex surface; (b) a thin film according to any of the embodiments described above disposed on the concave surface of the curved substrate such that the naturally curved second surface of the thin film faces the concave surface of the curved substrate.

The curved substrate has a concave surface and an opposing convex surface. The substrate can have any suitable shape. In some embodiments, the substrate has the general shape of a circle or an oval. In some embodiments, the electro-active system is designed to be disposed on the surface of a spectacle lens. In some such embodiments, the shape of the substrate can vary depending on the shape of the spectacle lenses onto which the electro-active system is to be disposed. In some embodiments where the substrate has a generally circular shape, the diameter can range from 3 to 20 mm, or from 5 to 15 mm.

The substrate can have any suitable appearance. In some embodiments, the substrate is transparent, meaning that it transmits at least 75%, or at least 80%, or at least 85%, or at least 90%, or at least 95%, or at least 97%, or at least 99% of visible light.

The curved substrate can be made of any suitable material. In some embodiments, the curved substrate is relatively rigid, and is composed of a material that provides such rigidity. For example, in some embodiments, the curved substrate can be a glass, or quartz, or a polymeric material, such as polycarbonate.

The substrate can have any suitable thickness. In some embodiments, the thin film has a thickness ranging from 100 µm to 5 mm, or from 300 µm to 2 mm, or from 500 µm to 1.5 mm. In some embodiments, the thickness is about 500 µm, or 700 µm, or 900 µm, or 1100 µm, or 1300 µm. In some embodiments, the substrate has a thickness that is sufficient to confer structural integrity and support the thin film that is disposed on the substrate.

In some embodiments, the electro-active system includes an adhesive layer disposed between the curved substrate and the thin film. In some such embodiments, the adhesive layer does not fill the entire space between the curved substrate and the thin film. In some embodiments, the adhesive layer forms a continuous line around the outer region of the space between the curved substrate and the thin film, thereby forming a cavity between the curved substrate and the thin film where no adhesive layer is present. In some embodiments, this cavity lies in the central region of the curved substrate. In some further embodiments, the cavity is a sealed cavity, where the cavity is sealed by a continuous line of the adhesive layer around the outer edge region of the space between the curved substrate and the thin film. In some embodiments, an additional sealing material may be used, for example, to close any gaps. In some embodiments, one or more of the relief structures lie within the cavity.

The cavity can have any suitable dimensions. In some embodiments, the height of the cavity is greater than the height of the relief structures, for example, at least two times, or at least three times, or at least four times, or at least 5 times the height of the relief structures.

In some embodiments, the cavity is filled with an electro-active material. Electro-active materials are well known in the art, and include, but are not limited to, optical birefringent materials, such as liquid crystals. In some embodiments, the electro-active material only partially fills the cavity. In some other embodiments, the electro-active material fills the cavity, i.e., occupies at least 75%, or at least 80%, or at least 85%, or at least 90%, or at least 95% of the volume of the cavity.

In some embodiments, the electro-active system includes various electrical structures, such as electrical contacts and/or electrical wires. In some embodiments, these electrical structures are transparent electrical structures, meaning that they transmit at least 75%, or at least 80%, or at least 85%, or at least 90%, or at least 95%, or at least 97%, or at least 99% of visible light. These electrical structures can be made of any suitable transparent conductive material, such as indium tin oxide (ITO), conductive polymers, carbon nanotubes, or any mixtures thereof. Such structures can be disposed on the surfaces of the curved substrate and/or the thin film. These structures can be disposed on the surfaces by any suitable method, including but not limited to, various lithographic or printing methods.

Figure 7:
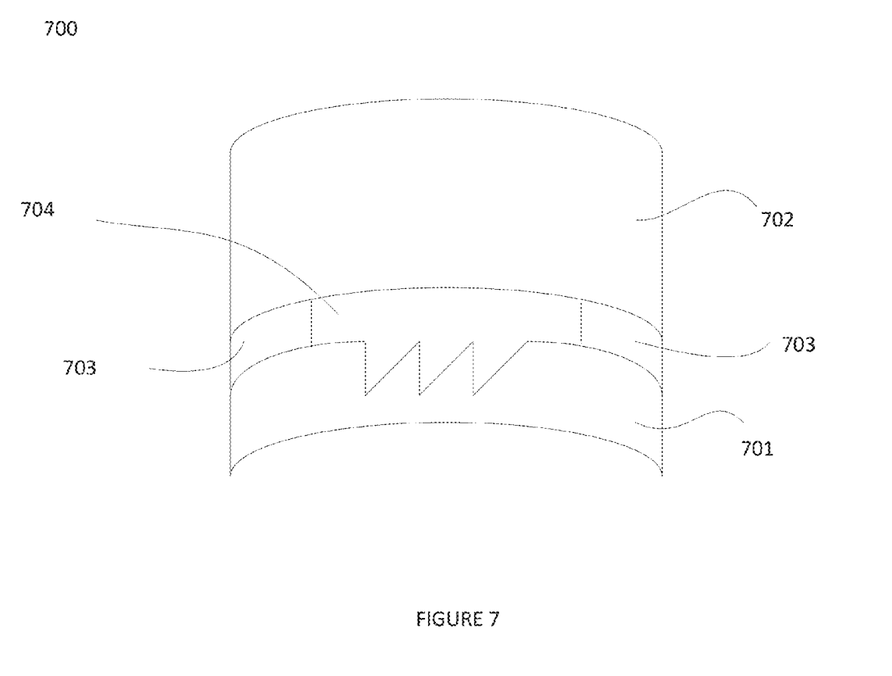
FIG. 7 depicts an electro-active system.

FIG. 7 depicts one embodiment of an electro-active system of the invention. In such embodiments, the electro-active system 700 includes a naturally curved thin film 701, a curved substrate 702, an adhesive layer 703 (which encircles the outer portion of the region between the curved substrate and the thin film), and a sealed cavity 704. In some embodiments, the sealed cavity contains an electro-active fluid.

In another aspect, the invention provides methods of making an electro-active system, comprising: (a) providing a curved substrate having a concave surface and a convex surface, wherein the concave surface is opposite the convex surface; (b) providing a thin film of any of the embodiments described herein; (c) securing the thin film to the curved substrate such that the naturally curved second surface of the thin film faces the concave surface of the curved substrate and forms a sealed cavity between the thin film and the curved substrate; and (d) injecting an electro-active material into the sealed cavity via an injection site in the thin film.

The method includes providing a curved substrate. The method is not limited to any particular type of curved substrate. In some embodiments, a curved substrate according to any of the embodiments can be used.

The method includes providing a thin film. The invention is not limited to any particular type of thin film. In some embodiments, a thin film according to any of the above embodiments can be used.

The method includes securing the thin film to the curved substrate. The securing can be carried out by any suitable means. In some embodiments, the securing comprises applying an adhesive, for example, to the curved substrate, the thin film, or both, and positioning them together. In some such embodiments, the adhesive is a photo-curable adhesive, such as a UV-curable adhesive. In such embodiments, the securing further comprises exposing the photo-curable adhesive to light, such as UV light, so as to cure the adhesive material.

The adhesive can be applied in any suitable manner, such as in one or more layers. In some embodiments, the adhesive layer does not fill the entire space between the curved substrate and the thin film. In some embodiments, the adhesive layer forms a continuous line around the outer region of the space between the curved substrate and the thin film, thereby forming a cavity between the curved substrate and the thin film where no adhesive layer is present. In some embodiments, this cavity lies in the central region of the curved substrate. In some further embodiments, the cavity is sealed by a continuous line of the adhesive layer around the outer edge region of the space between the curved substrate and the thin film. In some embodiments, ad additional sealing material may be used, for example, to close any gaps. In some embodiments, one or more of the relief structures lie within the cavity.

The cavity can have any suitable dimensions. In some embodiments, the height of the cavity is greater than the height of the relief structures, for example, at least two times, or at least three times, or at least four times, or at least 5 times the height of the relief structures.

The method includes injecting an electro-optical material into the sealed cavity. In some embodiments, the injecting is carried out in a manner such that the cavity is in a sealed state following the injecting. In some embodiments, where the injecting may leave a tiny aperture in the thin film at the injection site following the injecting, a sealant, such as a transparent sealant is applied to the injection site to re-seal the cavity. In other embodiments, the thin film is made of a material that is at least slightly gelatinous, such that it can re-seal itself at the injection site following the injection of the electro-active material. Such properties can be obtained by controlling the degree to which the film is cured, so as to retain some very slight amount of gel-like properties.

Any suitable electro-active materials can be used, including, but are not limited to, optical birefringent materials, such as liquid crystals. In some embodiments, the electro-active material only partially fills the cavity. In some other embodiments, the electro-active material fills the cavity, i.e., occupies at least 75%, or at least 80%, or at least 85%, or at least 90%, or at least 95% of the volume of the cavity.

In some embodiments, the method includes disposing various electrical structures, such as electrical contacts and/or electrical wires onto one or more surfaces of the curved substrate and/or the thin film. In some embodiments, these electrical structures are transparent electrical structures, meaning that they transmit at least 75%, or at least 80%, or at least 85%, or at least 90%, or at least 95%, or at least 97%, or at least 99% of visible light. These electrical structures can be made of any suitable transparent conductive material, such as indium tin oxide (ITO), conductive polymers, carbon nanotubes, or any mixtures thereof. These structures can be disposed on the surfaces by any suitable method, including but not limited to, various lithographic or printing methods.

Figure 8:
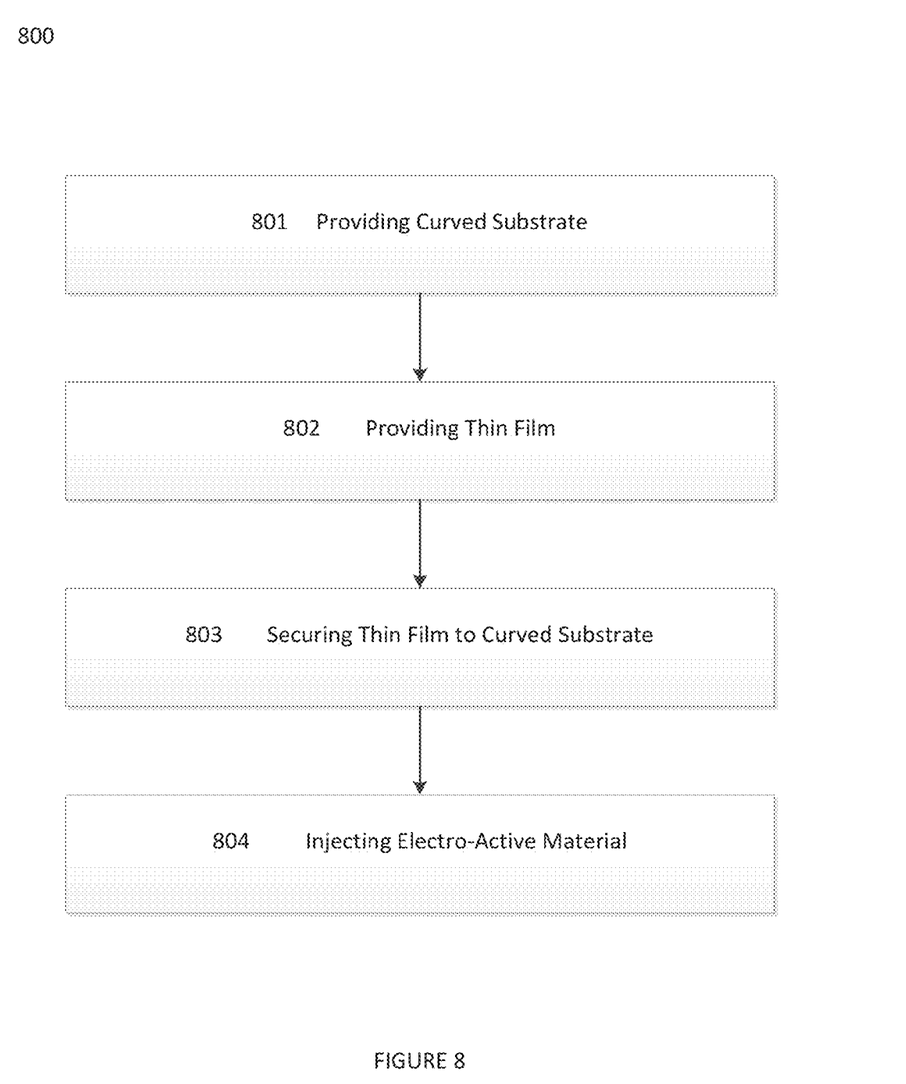
FIG. 8 depicts a flow diagram for a method of making an electro-active system.

FIG. 8 depicts a flow diagram for a method of making an electro-active system. In such embodiments, the method includes: (a) providing a curved substrate having a concave surface and a convex surface, wherein the concave surface is opposite the convex surface 801; (b) providing a thin film of any of the embodiments described herein 802; (c) securing the thin film to the curved substrate such that the naturally curved second surface of the thin film faces the concave surface of the curved substrate and forms a sealed cavity between the thin film and the curved substrate 803; and (d) injecting an electro-active material into the sealed cavity via an injection site in the thin film 804.

In another aspect, the invention provides an optical substrate (e.g., a lens or a lens blank), where an electro-active system according to any of the above embodiments is disposed on a surface of the optical substrate. In some embodiments, the surface of the lens or lens blank onto which the electro-active system is disposed is a slightly curved surface, e.g., the convex surface on the outer side of a spectacle lens. In some embodiments, the side of the electro-active system having the thin film exposed is disposed against the surface of the optical substrate. The electro-active system can be secured to the lens or lens blank by any suitable means. In some embodiments, the electro-active system is secured to the lens or lens blank by means of an adhesive.

Figure 9:
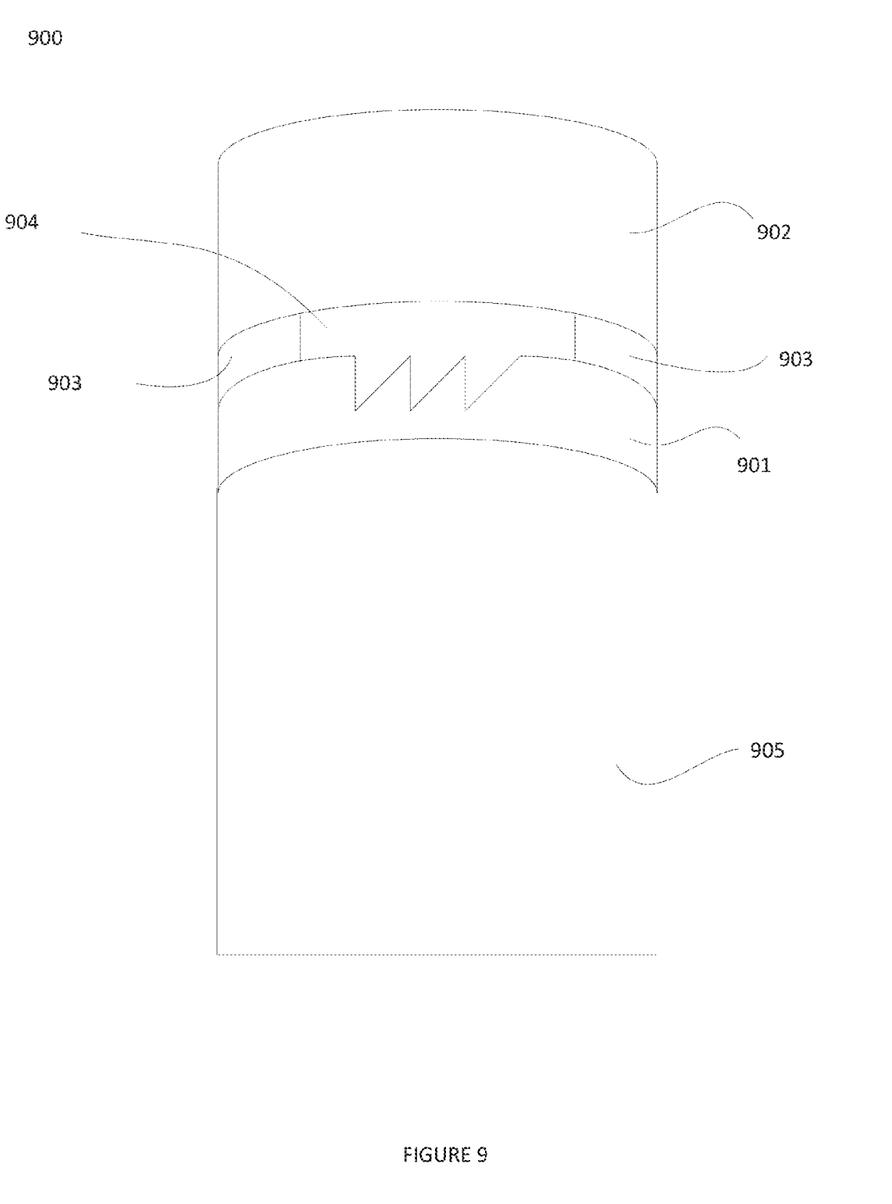
FIG. 9 depicts an electro-active system disposed on an optical substrate.

FIG. 9 depicts one embodiment of the invention, where the electro-active system is disposed on an optical substrate. In such embodiments, the electro-active system includes a naturally curved thin film 901, a curved substrate 902, an adhesive layer 903 (which encircles the outer portion of the region between the curved substrate and the thin film), and a sealed cavity 904. In some embodiments, the sealed cavity contains an electro-active fluid. The electro-active system is disposed onto an optical substrate 905, such as a lens blank or a lens.

In another aspect, the invention provides a method of making a lens or lens blank comprising making an electro-active system according to any of the above embodiments, and disposing the electro-active system on lenses or lens blanks. In some embodiments, the surface of the lens or lens blank onto which the electro-active system is disposed is a slightly curved surface, e.g., the convex surface on the outer side of a spectacle lens. In some embodiments, the side of the electro-active system having the thin film exposed is disposed against the surface of the lens or lens blank. The electro-active system can be secured to the lens or lens blank by any suitable means.

In some embodiments, the electro-active system is secured to the lens or lens blank by means of an adhesive. In some embodiments, the adhesive is a photo-curable adhesive, such as a UV-curable adhesive. In some such embodiments, the disposing comprises applying a photo-curable adhesive to the electro-active system and/or to the lens or lens blank, and exposing the photo-curable adhesive to light, such as UV light.

Figure 10:
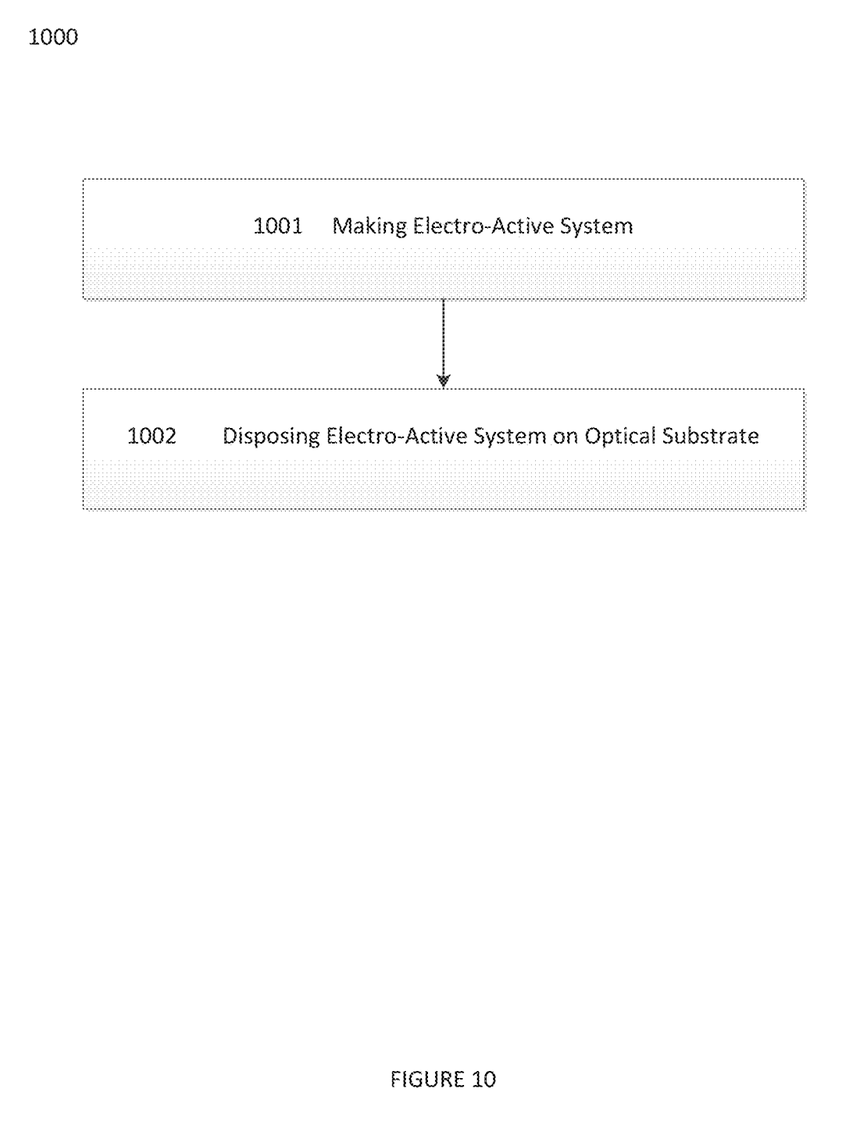
FIG. 10 depicts a flow diagram for a method of making an optical substrate having an electro-active system.

FIG. 10 shows a flow diagram for making an optical substrate that includes an electro-active system. In the depicted embodiment, the method includes making an electro-active system according to any of the above embodiments 1001, and disposing the electro-active system on an optical substrate 1002.

The invention claimed is:

1. A method of making a film having surface relief features, comprising:
    providing a first substrate having a first surface, wherein the first substrate is composed of a water-soluble solid material;
    providing a second substrate having a first surface, wherein the second substrate is composed of a solid material and the first surface of the second substrate comprises one or more relief structures;
    providing a curable liquid material;
    disposing the curable liquid material between the first surface of the first substrate and the first surface of the second substrate, wherein the first surface of the first substrate and the first surface of the second substrate are adjacent to each other;
    curing the curable liquid material to form a polymeric film between the first surface of the first substrate and the first surface of the second substrate;
    removing the first substrate from the polymeric film; and
    incorporating the polymeric film into an electro-active system disposed on a lens or a lens blank, wherein:
        the electro-active system has a curved substrate having a concave surface and a convex surface, wherein the concave surface is opposite the convex surface; and
        the polymeric film is disposed on the concave surface of the curved substrate such that a naturally curved surface of the polymeric film faces the concave surface of the curved substrate.

2. The method of claim 1, wherein the water-soluble solid material comprises a water-soluble polymer.

3. The method of claim 2, wherein the water-soluble polymer comprises polyvinyl alcohol, a polyacrylamide, a polyacrylic acid, a polyisocyanate, a starch, or a cellulose.

4. The method of claim 3, wherein the water-soluble polymer comprises polyvinyl alcohol.

5. The method of claim 1, wherein the first surface of the first substrate is a curved surface.

6. The method of claim 5, wherein the first surface of the second substrate is a curved surface.

7. The method of claim 6, wherein the radius of curvature of the first surface of the first substrate is within 15% of the radius of curvature of the first surface of the second substrate.

8. The method of claim 7, wherein one of the first surfaces is a convex surface and the other is a concave surface.

9. The method of claim 1, wherein the curable liquid material is a liquid monomer, a liquid oligomer, or a mixture thereof.

10. The method of claim 9, wherein the curable liquid material is a photo-curable material.

11. The method of claim 9, wherein the curable liquid material is a thermally curable material.

12. The method of claim 1, wherein the one or more relief structures are inverted diffractive structures.

13. The method of claim 12, wherein the one or more relief structures have a height that ranges from 1 nm to 500 µm.

14. The method of claim 1, wherein the first surface of the second substrate comprises a plurality of relief structures, and wherein one or more adjacent pairs of relief structures are separated by a distance ranging from 1 nm to 500 µm.

15. The method of claim 1, wherein the disposing the curable liquid material between the first surface of the first substrate and the first surface of the second substrate comprises separating the first surface of the first substrate from the first surface of the second substrate by a distance of 1 µm to 1 mm.

16. The method of claim 1, wherein the curing comprises heating the liquid curable material.

17. The method of claim 1, wherein the curing comprises exposing the liquid curable material to ultraviolet light.

18. The method of claim 1, wherein the polymer film is transparent.

19. The method of claim 1, wherein the removing the first substrate from the polymeric film comprises exposing the first substrate to an aqueous medium.

20. The method of claim 1, further comprising:
removing the polymeric film from the second substrate.

21. The method of claim 1, wherein the polymeric film comprises:
a naturally curved first surface; and
a naturally curved second surface disposed opposite the naturally curved second surface, wherein the naturally curved second surface comprises one or more relief structures;
wherein the naturally curved first surface is concave, and the naturally curved second surface is convex, and wherein the radius of curvature of the naturally curved first surface is within 15% of the radius of curvature of the naturally curved second surface.

22. The method of claim 1, further comprising:
providing a curved substrate of an electro-active system, the curved substrate having a concave surface and a convex surface, wherein the concave surface is opposite the convex surface;
securing polymeric film to the curved substrate such that the naturally curved second surface of the thin film faces the concave surface of the curved substrate and forms a sealed cavity between the thin film and the curved substrate;
injecting an electro-active material into the sealed cavity via an injection site in the thin film.

23. The method of claim 1, wherein the first substrate and the second substrate are disposed adjacent to each other and the curable liquid material is disposed between the first substrate and the second substrate to fill a space between the first substrate and the second substrate.

* * * * *